(12) United States Patent
Cheng et al.

(10) Patent No.: US 12,330,401 B2
(45) Date of Patent: Jun. 17, 2025

(54) MDO BARRIER FILM, PACKAGE LAMINATES CONTAINING THE SAME, AND METHODS OF MAKING THE SAME

(71) Applicant: The Procter & Gamble Company, Cincinnati, OH (US)

(72) Inventors: Zhan Cheng, Beijing (CN); Dong Ruan, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/981,646

(22) Filed: Nov. 7, 2022

(65) Prior Publication Data
US 2023/0145052 A1    May 11, 2023

(30) Foreign Application Priority Data

Nov. 8, 2021    (WO) ................ PCT/CN2021/129228

(51) Int. Cl.
| | |
|---|---|
| *B32B 27/08* | (2006.01) |
| *B32B 7/12* | (2006.01) |
| *B32B 27/30* | (2006.01) |
| *B32B 27/32* | (2006.01) |
| *B65D 65/40* | (2006.01) |

(52) U.S. Cl.
CPC ................ *B32B 27/08* (2013.01); *B32B 7/12* (2013.01); *B32B 27/306* (2013.01); *B32B 27/32* (2013.01); *B65D 65/40* (2013.01); *B32B 2250/246* (2013.01); *B32B 2250/40* (2013.01); *B32B 2307/516* (2013.01); *B32B 2307/72* (2013.01); *B32B 2307/7244* (2013.01); *B32B 2307/732* (2013.01); *B32B 2439/00* (2013.01)

(58) Field of Classification Search
CPC .............................. B32B 27/306; B32B 27/32
See application file for complete search history.

(56) References Cited

U.S. PATENT DOCUMENTS

| | | |
|---|---|---|
| 2004/0005389 A1 | 1/2004 | Reighard et al. |
| 2004/0053054 A1 | 3/2004 | Bobovitch et al. |
| 2015/0282978 A1 | 10/2015 | Henderson |
| 2017/0297318 A1* | 10/2017 | Keiser ..................... B32B 27/10 |
| 2017/0361582 A1 | 12/2017 | Planeta et al. |

FOREIGN PATENT DOCUMENTS

DE    102019220384 A1 *  6/2021

OTHER PUBLICATIONS

Machine Translation of DE 102019220384 (Year: 2021).*
PCT Search Report and Written Opinion for PCT/CN2021/129228 dated Apr. 4, 2022, 11 pages.

* cited by examiner

*Primary Examiner* — Zachary M Davis
(74) *Attorney, Agent, or Firm* — John G. Powell; Elizabeth A. Conklin

(57) ABSTRACT

The present application is directed to machine directional oriented barrier film, package laminates containing the same, and methods of making the same. Said machine directional oriented (MDO) barrier film comprises a multi-layer structure having two spatially separated EVOH layers and an intermediate polyolefin layer between the two EVOH layers.

17 Claims, 3 Drawing Sheets

MDO BARRIER FILM, PACKAGE LAMINATES CONTAINING THE SAME, AND METHODS OF MAKING THE SAME

FIELD OF THE INVENTION

The present application is directed to machine directional oriented barrier film, package laminates containing the same, and methods of making the same.

BACKGROUND OF THE INVENTION

Flexible thermoplastic films (also referring to "flexibles") are used in a variety of applications including the construction of packaging and containers, protective films and coatings, and even wallpapers. Along with the requirement of environmental protection, fully recyclable flexibles are being more focused. A Mono material film structure, such as mono polyethylene (PE) can construct fully recyclable flexibles. However, a mono material in nature is lack of many required barrier performances, such as Oxygen and perfume barrier. Ethylene vinyl alcohol copolymer (hereinafter referring to "EVOH") is a thermoplastic copolymer having good barrier resistance to gases such as oxygen and perfume. Thus PE-EVOH coextrusion film has been used in flexibles for high barrier applications. The barrier property is associated with the thickness and content of EVOH in the flexibles. The thicker the EVOH layer is, the better the barrier property is. However, to meet the recyclability requirement, the content of barrier polymers such as EVOH in the flexibles should be lower than a specific amount (e.g., <5%). Therefore, there is a continuous need for flexibles that provide better barrier property and at the same time meet recyclability requirement.

One approach being developed is to introduce orientation (e.g., machine directional) process for EVOH-containing barrier film. Recent research has developed that PE-EVOH co-extrusion film after orientation can provide improved barrier function vs. without being oriented. But still there are always challenges to obtain desired barrier function by using minimum barrier polymer to meet both recyclability requirement as well as processing easiness/feasibility. Therefore, there is a need to provide fully recyclable flexibles having barrier film containing minimum barrier polymers but provide sufficient/developed barrier property (and optionally sufficient/developed other physical properties such as transparency etc.).

SUMMARY OF THE INVENTION

The present invention meets one or more of these needs based on the surprising discovery that a barrier film comprising two EVOH layers separated by and being symmetrical against an intermediate polyolefin layer after machine directional orientation (MDO) provides desired barrier property as well as excellent transparency. Such film is provided by a particular process method, including a blown co-extrusion together with inline or offline MDO process.

In one aspect, the present disclosure provides a machine directional oriented (MDO) barrier film, comprising a multi-layer structure having two spatially separated EVOH layers and an intermediate polyolefin layer between the two EVOH layers. Preferably, the two EVOH layers are sandwiched between the intermediate polyolefin layer and an outer polyolefin layer. Preferably, the barrier film has symmetrical 9-layer structure.

In another aspect, the present disclosure provides a packaging laminate, for example a laminate for toothpaste tubes, comprising an outer film, an inner film, and the MDO barrier film described hereinwith which is positioned between the outer film and the inner film. Preferably, either of the outer film or the inner film, or both, comprises polyolefin, preferably polyethylene, more preferably HDPE, and even more preferably HDPE and MDPE blends.

In still another aspect, the present disclosure provides a method for producing a MDO 9-layer film, comprising the steps of:
1) providing 5 sublayers comprising, in sequence from outside to inside, a first PE layer, a first tie layer, a EVOH layer, a second tie layer, and a second PE layer, preferably, the EVOH layer has a thickness of at most of 20% of the total thickness of the 5 sublayers;
2) coextruding the 5 sublayers into a multi-layer film and blowing the film up into a bubble,
3) collapsing the bubble through nip rolls to flatten the bubble to make the second PE layer inside the bubble in direct contact,
4) stretching the collapsed film in machine direction to form the MDO 9-layer film.

It is an advantage of the barrier film of the present invention to provide desirable barrier property while utilizing less barrier polymer.

It is an advantage of the barrier film of the present invention to provide better transparency than conventional non-oriented films.

It is an advantage of the barrier film of the present invention being capable to provide desirably much thicker film with desirably less barrier polymer.

Still another advantage of the present invention is cost efficiency associated with less usage of EVOH in the package.

Yet still another advantage of the present invention is to provide a specific pattern of barrier film layer structure, i.e., a symmetrical multilayer structure.

Further still another advantage of the present invention is to reduce the need to laminate two barrier film into structures with desired barrier.

Further advantages may include cost saving for capital investment, etc.

These and other features, aspects and advantages of specific embodiments will become evident to those skilled in the art from a reading of the present disclosure.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, and in which:

DETAILED DESCRIPTION OF THE INVENTION

Figure 1:
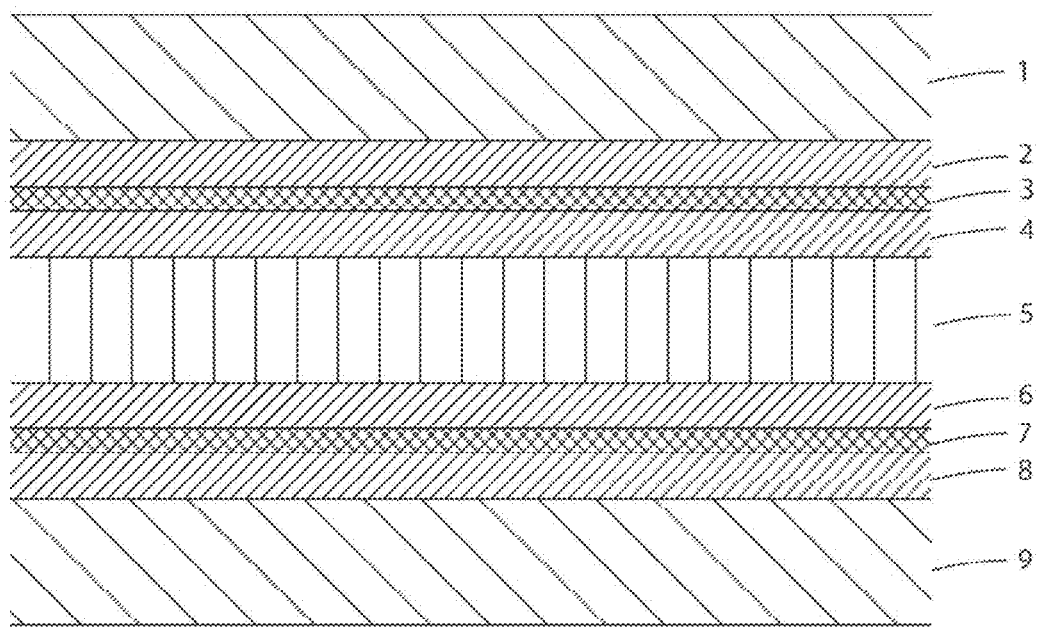
FIG. 1 illustrates an embodiment of the barrier film according to the present disclosure.

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

As used herein, the terms "consisting essentially of" means that the composition contains less than about 1%, preferably less than about 0.5%, of ingredients other than those listed.

Further, the terms "essentially free of," "substantially free of" or "substantially free from" means that the indicated material is present in the amount of from 0 wt % to about 0.5 wt %, or preferably from 0 wt % to about 0.1 wt %, or more preferably from 0 wt % to about 0.01 wt %, and most preferably it is not present at analytically detectable levels.

EVOH (Ethylene vinyl alcohol copolymer) is a flexible, thermoplastic copolymer with good barrier properties to gases such as oxygen, nitrogen, and carbon dioxide. However, EVOH loses its good gas barrier properties when absorbing moisture. For this reason and to optimize both cost and performance, it is frequently used to co-extrude EVOH in multilayer with PE, PP, which have superior moisture barrier properties. Cast film processing or blown film processing may provide a multilayer PE-EVOH film.

It has been discovered that orientation (e.g., machine directional) process makes PE-EVOH barrier film exhibit improved barrier function compared with those films not being oriented. Surprisingly, the applicant discovered a PE-EVOH co-extrusion blown film undertaken a MDO process provides an excellent barrier property, at the same time makes a container using such film fully recyclable.

In another aspect, HDPE is a preferred type of PE due to its recyclability (in HDPE recycling stream). However, high density PE has less transparency. This application surprisingly provides fully recyclable HDPE-EVOH co-extrusion blown MDO film having desirable transparency.

In the context of the present invention, the term "recyclable" means capable of being recycled. In particular, a fully recyclable laminate or package means such laminate or package meet the requirement for fully recycle according to CEEFLEX guideline and test protocol (or other suitable reginal or country wise criteria). Preferably, a "recyclable" or "fully recyclable" package laminate containing EVOH barrier film as described in the present invention means that the package laminate contains mainly PE or PP materials and contains EVOH at a level of no more than 20% by weight of the whole package laminate. Beyond 20% makes the package laminate not compatible with PE or PP mechanical recycling, while 10-20% with limited compatibility pending tests according to CEEFLEX protocols. Below 10% is normally seen as compatible with current mechanical recycling.

The present disclosure is directed to a machine directional oriented (MDO) barrier film, comprising a multi-layer structure having two spatially separated EVOH layers and an intermediate non-EVOH layer between the two EVOH layers. Preferably, the intermediate non-EVOH layer is an intermediate polyolefin layer.

Preferably, each of said two EVOH layers in the MDO barrier film of the present invention has a thickness of about 6 microns or below, preferably from about 1 micron to about 6 microns, more preferably from about 2 microns to about 5 microns, for example has a thickness of 2 microns, or 3 microns, or 4 microns.

The intermediate polyolefin layer is positioned in between of the two EVOH layers in the barrier film of the present invention. The intermediate polyolefin layer can comprise materials selected from polyethylene (PE), polypropylene (PP), or combinations thereof. Preferably, the intermediate polyolefin layer comprises PE.

Preferably, the intermediate layer comprises polyolefins having density in the range of 0.870 to 0.928 g/cm$^3$, preferably polyethylene selected from MDPE, LDPE, LLDPE, Elastomer, or blends thereof. In a preferred example, the intermediate polyolefin layer comprises LLDPE or blends of elastomer and LLDPE. In a preferred example, the material for the intermediate polyolefin layer has a stickiness that capable of being self-stuck, forming a harmonious polyolefin layer. Preferably, the intermediate polyolefin layer in the MDO barrier film of the present invention is substantially free of anti-block agent and/or slip agent.

PE is generally divided into high-density (HDPE, density 0.941 g/cm$^3$ or greater), medium-density (MDPE, density from 0.926 to 0.940 g/cm$^3$), low-density (LDPE, density from 0.910 to 0.925 g/cm$^3$), and linear low-density polyethylene (LLDPE, density from 0.880 to 0.910 g/cm$^3$). See e.g., ASTM D4976-98: Standard Specification for Polyethylene Plastic Molding and Extrusion Materials. Suitable suppliers/products for PE may include Dowlex™ from Dow Chemical, and Borstar™ from Borealis and Borouge and Exceed™ from Exxon Mobil.

Particularly, each of the two EVOH layers is sandwiched between the intermediate polyolefin layer and an outer polyolefin layer. The outer polyolefin layer that positioned outside of the EVOH layer, and the outer polyolefin layer can comprise materials selected from polyethylene (PE), polypropylene (PP), or combinations thereof. Preferably, the outer polyolefin layers comprise polyethylene. In a preferred example, the outer polyolefin layers comprise blends of high-density polyethylene (HDPE) and medium density polyethylene (MDPE). For example, the outer polyolefin layers comprise blends of 10%~90% HDPE and 90%~10% MDPE, preferably 20%~80% HDPE and 80%~20% MDPE.

Preferably, the MDO barrier film further comprises tie layers between each of said EVOH layers and the intermediate polyolefin layer, and between each of said EVOH layers and said outer polyolefin layer. Tie layers may also be referred to as "adhesive layers" as the layers comprise material specifically selected to bond the barrier EVOH material to the adjacent polyolefin layers. The tie layers may comprise a polymeric material that includes a tie resin (e.g., ethylene acrylic acid (EAA), a functionalized polyolefin such as Maleic anhydride grafted LLDPE (LLDPE-g-MAH), etc.). Suitable commercially tie materials include, but not limiting to, Dupont adhesive resin (e.g., 41E687), FIG. 1 shows an embodiment of a MDO barrier film according to the present invention. The barrier film 10 of the present invention may be flexible—i.e., capable of being bent without breaking. The barrier film 10 of the present invention comprises two EVOH layers 3, 7 which are spatially apart from each other, and have an intermediate polyolefin layer 5. The EVOH layer 3 is sandwiched by the intermediate polyolefin layer 5 and an outer polyolefin layer 1. The EVOH layer 7 is sandwiched by the intermediate polyolefin layer 5 and an outer polyolefin layer 9. Tie layers 2, 4, 6, 8 help bond/adhere the EVOH layer 3, 7 to the intermediate polyolefin layer 5 and the outer polyolefin layers 1, 9 respectively. The outer polyolefin layers 1 and 9 are identical and can be materials selected from the group consisting of polyethylene (PE), polypropylene (PP), and combinations thereof. The outer polyolefin layers 1 and 9 can be any desired thickness as a co-extrusion blown film can provided. E.g., each of the outer polyolefin layers 1 and 9 can have a thickness of 1 micron to 10 microns, preferably from 2 microns to 8 microns. The intermediate polyolefin layer 5 can be materials selected from the group consisting of polyethylene (PE), polypropylene (PP), and combinations thereof. The intermediate polyolefin layer 5 can be the same or different material, preferably different material as the outer polyolefin layers 1 and 9. The intermediate polyolefin layer 5 has a thickness of from about 2 microns to about 20 microns, preferably from about 3 microns to about 16 microns, e.g., about 4 microns, or 6 microns, or 8 microns, or 10 microns, etc. The tie layers 2, 4, 6, 8 can be the same material selected from ethylene acrylic acid (EAA), a functionalized polyolefin such as maleic anhydride, grafted LLDPE, and combinations thereof.

In one particular example, the barrier film has the 9-layer structure which is symmetrical, containing from one side to the other, in sequential, an outer PE layer 1, a tie layer 2, a EVOH layer 3, a tie layer 4, intermediate PE layer 5, a tie layer 6, a EVOH layer 7, tie layer 8, and outer PE layer 9.

The total thickness of the MDO barrier film according to the present disclosure may be from about 20 microns to about 80 microns, preferably from about 30 microns to about 60 microns. In a preferred example, the total thickness of the MDO barrier film may be about 35 microns, or 40 microns, or 45 microns, or 50 microns, or 55 microns, or 60 microns, or 65 microns, or 70 microns.

In an alternative example, the MDO barrier film comprises a structure a multi-layer structure having two spatially separated EVOH layers and an intermediate non-EVOH layer between the two EVOH layers, where the non-EVOH layer is a tie layer. In a particular example, the MMDO barrier film has a 7-layer structure containing from one side to the other, in sequential, a first PE layer, a first tie layer, a first EVOH layer, a second tie layer, a second EVOH layer, a third tie layer, and a second PE layer. In particular, the first PE layer and the second PE layer are the same, the first tie layer and the second tie layer are the same, the first EVOH and second EVOH layer are the same. Said 7-layer MDO barrier film can be produced by co-extrusion four sublayers with blown extrusion and machine directional orientation.

Processing Method

Figure 2:
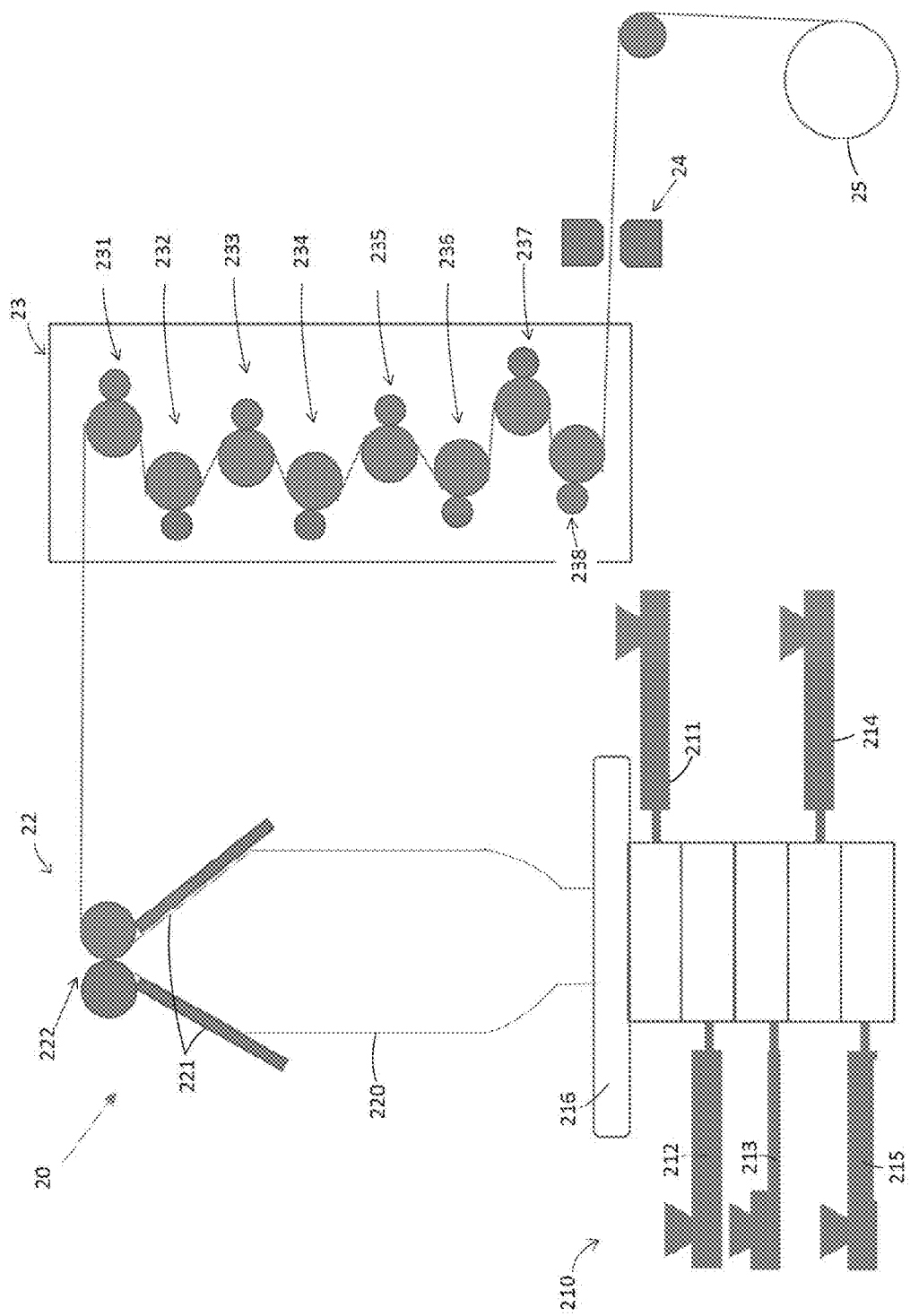
FIG. 2 illustrates a process for making the barrier film according to the present disclosure.

FIG. 2 is an illustrative drawing for the processing method of the MDO barrier film of the present invention.

The processing method 20 may comprise a blown extrusion step 21, a collapsing step 22, and a stretching step 23.

Referring to FIG. 2, the blown extrusion step 21 comprises a blown extrusion machine 210. The blown extrusion machine 210 comprises one or more extruders arranged around annular dies 216. According to standard blown-film practice, melted PE is extruded through the annular dies 216 to exit the annular dies 216 and is blown into a bubble 220 for further processing. In a non-limiting example, the blown extrusion machine 210 may comprise multiple extruders 211, 212, 213, 214, 215—each of which are loaded with a composition corresponding to an individual sublayer of the barrier film.

For instance, a first extruder 211 may be loaded with the material that is used to form an outer polyolefin layer of the MDO barrier film of the present invention. A second extruder 212 may be loaded with the material that is used to form a first tie layer. A third extruder 213 may be loaded with the material that is used to form a EVOH barrier layer. A fourth extruder 214 may be loaded with the material that is used to form a second tie layer. A fifth extruder 215 may be loaded with the material that is used to form intermediate polyolefin layer.

Each of the multiple extruders 211, 212, 213, 214, 215 may simultaneously extrude the respective material contained therein through the annular dies 216, whereby the resulting multi-layer extrudate is blown into the bubble 220. In the non-limiting example, the bubble 220 contains, from outside to inside, a first PE layer, a first tie layer, a EVOH layer, a second tie layer, and a second PE layer.

The bubble 220 is then pass through one or more guide tents 221, one or more nip rolls 222, compressed to make the innermost second PE layer of the bubble being closely contact into one intermediate polyolefin layer to form a 9-layer coextrusion film. In a non-limiting example, the 9-layer coextrusion film contains a structure of first PE/first tie/EVOH/second tie/second PE/second tie/EVOH/first tie/first PE.

The intermediate polyolefin layer in the 9-layer coextrusion film can be completely fused in conducted machine direction orientation (MDO) step 23. The MDO step 23 is inline conducted immediately after the collapsing step 22.

The machine direction (MD) is also known as the longitudinal direction (generally perpendicular to the traverse direction (TD)). During the MD orientation, the unconverted film from the blown (or casted line) is heated to an orientation temperature via one or multiple hot rollers (referring to 231, 232 in FIG. 2). The heated film is fed into a slow draw roll 233 with a nip roller, which has the same rolling speed as the heating rollers 231, 232. The film then enters a fast draw roll 234. The fast draw roll 234 has a speed that is 2 to 10 times faster than the slow draw roll 233, which effectively stretches the film on a continuous basis. There can be another fast draw roll (not illustrated) which is even faster than the first fast draw roll so that the film is subjected to two-step stretching. Optionally, between the two stretching steps there is another set of heating rolls (not illustrated) which sets the temperature of the film after the first stretching and before the second stretching. The temperatures in these two stretching steps can be the same or different. The orientation can also be a single stretching instead of two-step stretching. The film then passes through one or more annealing rolls 235, 236 for annealing some time, following by passes through one or more cooling rolls 237, 238. The MDO film can be optionally conducted a corona treating on one or both side of the film through a corona treater 24 and being winded via a winded film reel 25.

Such blown co-extrusion process with inline MD orientation process, provides a 9-layer barrier film from 5-extruder coextrusion machine. The collapsing film and inner layer self-sticking step double the thickness of the blown film, resulting the final MDO barrier film having symmetrical structure, and improved barrier property. Traditionally, blown film co-extrusion process use the same number of extruders as the layers in the film product. That is, when the bubble passes through nip rolls and collapses, the two pieces of the bubble are desired not to stick together, and sometimes anti-block agent and slip agent being added in the middle of the bubble, to make sure two pieces of film are ready to be separated before wind in the next step. The process of the present invention surprisingly provides a double thickness layer with symmetrical structure containing two spatially separated EVOH polymer barrier layers, using a special formulated film especially in the inner most second PE layer, and combining an inline MDO processing step.

The total MDO stretch ratio of the MDO barrier film of the present invention can be from 2:1 to 10:1, more preferably from 3:1 to 9:1, and even more preferably from 4:1 to 6:1. The total MDO stretch ratio includes all orientation steps. For example, if a two-step orientation is used with first stretch ratio 2:1 and second stretch ratio 3:1, the total stretch ratio is therefore 6:1.

The orientation temperature in a MD orientation, is around 50° C. to below 140° C., preferably below 130° C., more preferably below 120° C., alternatively 60° C. to 120° C., or below 115° C., or from 70° C. to 115° C. The temperature also depends on the process speed. In general, higher process speed requires relatively higher temperature due to the relative shorter contacting time between film and hot rollers; while slower process speed requires relatively lower temperature due to the longer contacting time.

The thickness of the MDO PE-EVOH barrier film of the present invention is from about 5 microns to about 50 microns, preferably from about 10 microns to about 45 microns, more preferably from about 15 microns to about 40 microns, most preferably from about 20 microns to about 35 microns. Preferably, the EVOH layers have a thickness no more than 20% of the total thickness of the MDO barrier film.

Alternatively, the process can be conducted from co-extruding 4 sublayers to produce a 7-layer MDO barrier film, from 6 sublayers to produce a 11-layer MDO barrier film, or from 7 sublayers to produce a 13-layer MDO barrier film, as desired and appropriated.

Package Laminates

Another aspect of the present invention provides package laminates containing the MDO barrier film described hereinabove. The package laminates can be used for many applications having high air or perfume barrier requirement such as food packaging, toothpaste tube, etc.

The package laminates of the present invention comprise an outer film, the MDO barrier film described hereinabove, and an inner film, wherein the MDO barrier film is positioned between the outer film and the inner film. The outer film can be materials selected from PE, PP, and the combinations thereof. The inner film can be materials selected from PE, PP, and the combinations thereof. The outer film and the inner film can be the same or different. In a preferred example, both the outer film and the inner film comprise PE, preferably high-density polyethylene (HDPE). In a preferred example, either the outer film or the inner film, or both, are consisting essentially of polyethylene, preferably prominent (80% and above) with high-density polyethylene (HDPE).

The package laminates can be made by extrusion or by adhesive lamination. In a lamination process, extrusion or adhesive layers are arranged between the outer film and the MDO barrier film, and between the MDO barrier film and the inner film. The adhesive layers of the package laminates can be the same or different material as the tie layer in the MDO barrier film, preferably selected from ethylene acrylic acid (EAA), a functionalized polyolefin such as maleic anhydride, grafted LLDPE, and combinations thereof. In a non-limiting example, the package laminates comprise a structure of PE/adhesive/MDO barrier/adhesive/PE. In the embodiment that the MDO barrier film is a 9-layer film, the package laminates comprise a structure of PE/adhesive/PE/tie/EVOH/tie/PE/tie/EVOH/tie/PE/adhesive/PE.

Preferably, the package laminates may be recyclable. More preferably, the laminate according to the present disclosure may comprise no more than 10% by weight, preferably no more than 7%, more preferably no more than 5%, most preferably no more than 3%, of thermoplastic polymer that is not PE.

EXAMPLES

Example 1

Inventive Examples 1 and 2—MDO Barrier Films

Inventive Examples 1 and 2 are MDO barrier films according to the present invention, made according to the method described in the present disclosure. The structures are shown in below Table 1.

TABLE 1

Structures of MDO barrier films of Inventive Examples 1 and 2

| Structure | Inventive Example 1 Thickness (μm) | Inventive Example 2 Thickness (μm) |
|---|---|---|
| PE[1] | 7 | 12 |
| Tie[2] | 3 | 3.5 |
| EVOH[3] | 2 | 5 |
| Tie[2] | 3 | 3.5 |
| Intermediate PE[4] | 10 | 12 |
| Tie[2] | 3 | 3.5 |
| EVOH[3] | 2 | 5 |
| Tie[2] | 3 | 3.5 |
| PE[1] | 7 | 12 |
| Machine direction orientation | | |
| Total thickness | 40 | 60 |

[1] 60% HDPE + 40% MDPE
[2] Maleic anhydride grafted PE
[3] EVOH is commercially available from kyray or Taiwanchangchun company
[4] The intermediate PE layer comprise 80% LLDPE + 20% polyolefin elastomer Inventive Example 3—Package Laminate Containing MDO Barrier Film Inventive example 3 is a package laminate according to the present invention, having a structure comprising outer PE film, a MDO barrier film of the present invention, and an inner PE film with adhesive layers in between. The package laminate is made by lamination of each film material with thickness listed in Table 2. The MDO barrier film in the package laminate of Inventive Example 3 is the same as the Inventive Example 1 where the thickness of the barrier film is 40 μm with the EVOH barrier layers having thickness of 4 μm.

TABLE 2

Structures of the package laminate of Inventive Example 3

| Inventive Example 3 | Structure/ material | Thickness |
|---|---|---|
| Outer film | PE[5] | 115 μm |
| Barrier film | MDO barrier film[6] | 40 μm (EVOH = 4 um) |
| Inner film | PE[5] | 76 μm |
| Total thickness | | ~265 μm[7] |

[5] Blown PE from Yantai Feng Felxiable Tech. Co. Ttd,, China
[6] MDO-barrier film of inventive example 1
[7] The total thickness comprises thickness of all film and thickness of adhesive between the films.

Comparative Example 1 is provided, a laminate having a total thickness of 250 μm with a single EVOH layer having a thickness of 15 μm. Comparative Examples 1 is a laminate product HDPE EcoCare 250/15 from Amcor, China.

Example 2. Oxygen Transmission Rate Test

Oxygen Transmission Rate (OTR) test is a method to test the barrier property of a film. This test method provides a procedure for the determination of the steady-state rate of transmission of oxygen gas through plastics in the form of film, sheeting, laminates, etc. Test method is according to GB/T 19789-2005 (adapted from ASTM D3985). The less the value of OTR is, the better the barrier property is.

The OTR test for Inventive Example 3 and Comparative Example 1 were conducted according to Test method GB/T 19789-2005 (23C, 0% RH), completed by Nutrition & Health Research Institute, COFCO Corporation, Beijing, China. The results are shown in Table 3 below, in which Inventive Example 3 shows significantly better OTR than Comparative Example 1, although Inventive Example 3 has a much thinner EVOH thickness (4 μm total) than Comparative Example 1 (15 μm).

TABLE 3

Results of the OTR test

|  | EVOH thickness | OTR cm$^3$/ [m$^2$-day] |
| --- | --- | --- |
| Inventive Example 3 | 4 μm | 0.306 |
| Comparative Example 1 | 15 μm | 0.804 |

Example 3. Improved Luminous Transmittance

Luminous Transmittance Test is used to measure the transparency of the film. Test method is according to GB/T 2410-2008 (adapted from ASTM D1003), tested on JY-TF 03 (Guangzhou Jingyi Electronic science technology Co. Ltd, Guangzhou, China). The higher the value of luminous transmittance (%) is, the better the transparency property is.

Figure 3:
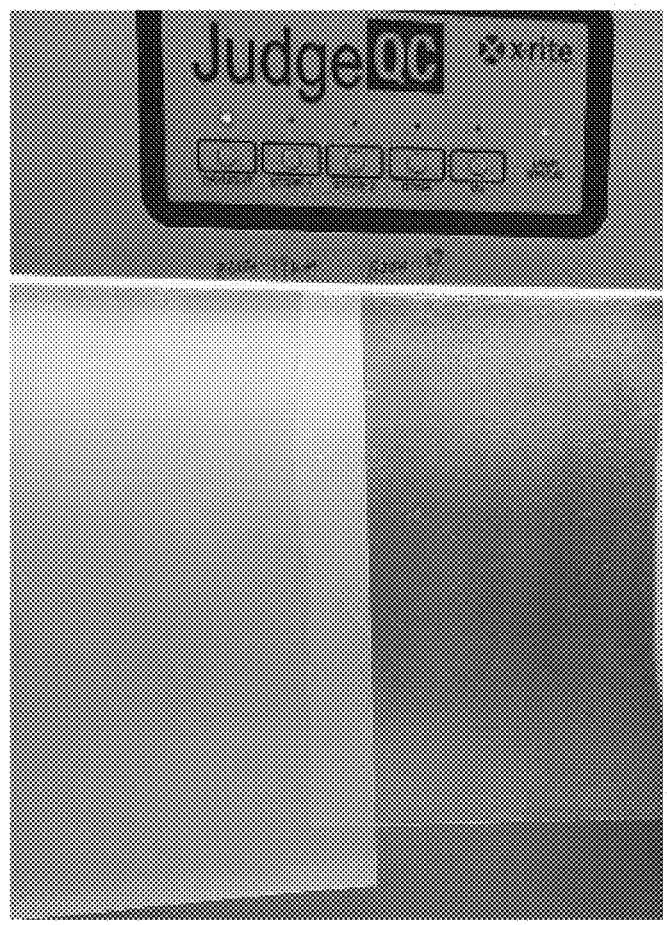
FIG. 3 shows pictures of inventive examples vs. comparative example regarding Luminous Transmittance.

Inventive Examples 1 and 2 and Comparative Example 2 were subject to the Luminous Transmittance Test. Comparative Example 2 is a commercially available barrier film having 5-layer structure of PE/tie/EVOH/tie/PE without MD oriented, wherein the EVOH thickness of 15 μm and total thickness of 79 μm. The results of the luminous transmittance test are shown in Table 4 below. Inventive Examples 1 and 2 show significantly improved luminous transmittance than Comparative Example 3. FIG. 3 provides a photograph picture that shows the comparison of transparency between the Inventive Example 1 (right) and the Comparative Example 2 (left). The Inventive Example 1 is clearly much transparent vs. the Comparative Example 2.

TABLE 4

Results of the Luminous Transmittance test

|  | Inventive Example 1 (40 μm) | Inventive Example 2 (60 μm) | Comparative Example 2 (79 μm) |
| --- | --- | --- | --- |
| Light transmittance % (@611 nm wavelength) | 90.3% | 90.6% | 84.7% |

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A machine directional oriented (MDO) barrier film, comprising:
    two ethylene vinyl alcohol (EVOH) layers, wherein the two EVOH layers are spatially separated from each other and each of the two EVOH layers has a thickness of 6 microns or below;
    an intermediate polyolefin layer between the two EVOH layers, wherein the intermediate polyolefin layer is substantially free of anti-block agent;
    tie layers between each of the two EVOH layers and the intermediate polyolefin layer; and
    two outer polyolefin layers comprising high-density polyethylene (HDPE), wherein each of the two EVOH layers is disposed between the intermediate polyolefin layer and the two outer polyolefin layers,
    wherein the MDO barrier film has a light transmittance of 90% or greater at a wavelength of 611 nm and the MDO barrier film has a total thickness of more than 20 microns to 70 microns.

2. The MDO barrier film according to claim 1, wherein the intermediate polyolefin layer comprises polyolefin having density in the range of 0.870 to 0.928 g/cm$^3$.

3. The MDO barrier film according to claim 2, wherein the polyolefin comprises polyethylene selected from medium-density polyethylene (MDPE), low-density polyethylene (LDPE), linear low-density polyethylene (LLDPE), elastomer, or blends thereof.

4. The MDO barrier film according to claim 2, wherein the polyolefin comprises a blend of linear low-density polyethylene (LLDPE) and polyolefin elastomer.

5. The MDO barrier film according to claim 1, wherein each of the two outer polyolefin layers further comprises medium-density polyethylene (MDPE).

6. The MDO barrier film according to claim 5, wherein each of the two outer polyolefin layers comprises greater than 50%, by weight of the outer polyolefin layer, of HDPE and less than 50%, by weight of the outer polyolefin layer, of MDPE.

7. The MDO barrier film according to claim 5, wherein each of the two outer polyolefin layers comprises about 60%, by weight of the outer polyolefin layer, of HDPE and about 40%, by weight of the outer polyolefin layer, of MDPE.

8. The MDO barrier film according to claim 1, having a symmetrical structure of PE/Tie/EVOH/Tie/PE/Tie/EVOH/Tie/PE.

9. The MDO barrier film according to claim 1, wherein a total thickness of the two EVOH layers is at most 20% of a total thickness of the MDO barrier film.

10. The MDO barrier film according to claim 1, further comprising additional tie layers between each of the two EVOH layers and the two outer polyolefin layers.

11. The MDO barrier film according to claim 1, wherein the intermediate polyolefin layer comprises less than 0.1 wt. % of the anti-block agent.

12. A packaging laminate, comprising an outer film, the MDO barrier film according to claim 1, and an inner film, wherein the MDO barrier film is positioned between the outer film and the inner film.

13. The packaging laminate of claim 12, wherein the outer film, the inner film, or both comprise a blend of HDPE and medium-density polyethylene (MDPE).

14. The packaging laminate of claim 12, wherein the packaging laminate is recyclable.

15. A machine directional oriented (MDO) 9-layer film, produced by process comprising the steps of:
   1) Providing 5 sublayers comprising, in sequence from outside to inside, a first polyethylene (PE) layer, a first tie layer, an ethylene vinyl alcohol (EVOH) layer, a second tie layer, and a second PE layer, wherein the second PE layer is substantially free of anti-block agent;
   2) Coextruding the 5 sublayers into a multi-layer film and blowing the film up into a bubble;
   3) Collapsing the bubble through nip rolls to flatten the bubble to make the second PE layer inside the bubble in direct contact to form a collapsed film; and
   4) Stretching the collapsed film in machine direction to form the MDO 9-layer film,
   wherein the MDO 9-layer film has a light transmittance of 90% or greater at a wavelength of 611 nm and the MDO barrier film has a total thickness of more than 20 microns to 70 microns.

16. The MDO 9-layer film of claim 15, wherein in the collapsing step 3) and stretching step 4), the second PE layer from both sides of the bubble laminate stick to each other to form an intermediate layer of the 9-layer film.

17. The MDO 9-layer film of claim 15, wherein the EVOH layer has a thickness of at most of 20% of a total thickness of the 5 sublayers.

* * * * *